(12) United States Patent
Kassa

(10) Patent No.: US 7,188,290 B2
(45) Date of Patent: Mar. 6, 2007

(54) DATA ALIGNMENT FOR TELECOMMUNICATIONS NETWORKS

(75) Inventor: Rolf Kassa, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 10/128,134

(22) Filed: Apr. 23, 2002

(65) Prior Publication Data

US 2003/0208709 A1    Nov. 6, 2003

(51) Int. Cl.
*G01R 31/28*    (2006.01)

(52) U.S. Cl. .................................................. 714/735

(58) Field of Classification Search ................ 714/724, 714/731, 732, 735, 712, 719, 744, 789; 375/368
See application file for complete search history.

(56) References Cited

U.S. PATENT DOCUMENTS

| | | | |
|---|---|---|---|
| 4,788,681 A | | 11/1988 | Thomas et al. |
| 5,040,195 A | | 8/1991 | Kosaka et al. |
| 5,210,754 A | * | 5/1993 | Takahashi et al. .......... 370/514 |
| 5,400,369 A | | 3/1995 | Ikemura |
| 6,260,167 B1 | * | 7/2001 | Lo et al. ..................... 714/744 |
| 6,876,630 B1 | | 4/2005 | Shim |
| 2002/0064181 A1 | | 5/2002 | Ofek et al. |

2003/0227943 A1    12/2003    Hallman et al.

OTHER PUBLICATIONS

International Telecommunication Union, "Series G: Transmission Systems and Media, Digital Systems and Networks" pp. 1-131 (2001).
Applied Micro Circuits Corporation, "S4801 Amazon Device Specification", pp. 56-57, Jul. 2000.
Intel, "IXF6048, 51/155/622/2488 Mbit/s SONET/SDH Cell/Packet Interface Datasheet", pp. 111-115, Oct. 2001.
European Telecommunications Standard Institute, "EN 300 417-1-1", Jun. 2001.
Intenational Telecommunication Union, "ITU-T Recommendation G.707/Y.1322", Nov. 2001.
Level One Communications, Inc., "SXT 6051 (New Mexico) Data Sheet/Production Specification", pp. 34-38, Jul. 1996.

* cited by examiner

*Primary Examiner*—James C. Kerveros
(74) *Attorney, Agent, or Firm*—Fish & Richardson P.C.

(57) ABSTRACT

An alignment module receives a sequence of un-aligned data words, finds a frame alignment word, and aligns the data words based on the position of the frame alignment word in the un-aligned data words. Comparators compare segments of two consecutive un-aligned data words to a frame alignment word and generate a first logic signal when there is a match. A shift register and a counter are used to determine which comparator generates the first logic signal. The counter sends a count to a barrel shifter, which shifts the un-aligned data words according to the count to generate aligned data words.

14 Claims, 3 Drawing Sheets

DATA ALIGNMENT FOR TELECOMMUNICATIONS NETWORKS

BACKGROUND

When data is transmitted through an optical network, words or frames are converted into a serial bit stream and sent through optical fiber. A receiver converts the serial bit stream back to a stream of data words or frames. For example, to send a stream of parallel 16-byte data words clocked at 83 MHz through a 10.7 gigabits-per-second (Gbps) optical network, a sender converts the 16-byte data words into a 10.7 Gbps serial bit stream, and sends the bit stream through the network. A receiver converts the bit stream back to an 83 MHz 16-byte parallel data stream.

When the serial bit stream is converted back to the parallel data stream, the converted 16-byte data words may not match the original data words. For example, a few bits from the original data word may offset each converted data word. Thus, the converted data words may need to be "re-aligned" to match the original data words. The sender may insert a pattern into the serial bit stream to assist the receiver in re-alignment of the data words. This pattern is often called a "frame alignment word (FAW)" because data to be sent over an optical network is often structured as "data frames," each frame having several hundred or more data words, and the FAW is placed at the beginning of each frame.

DETAILED DESCRIPTION

Figure 1:
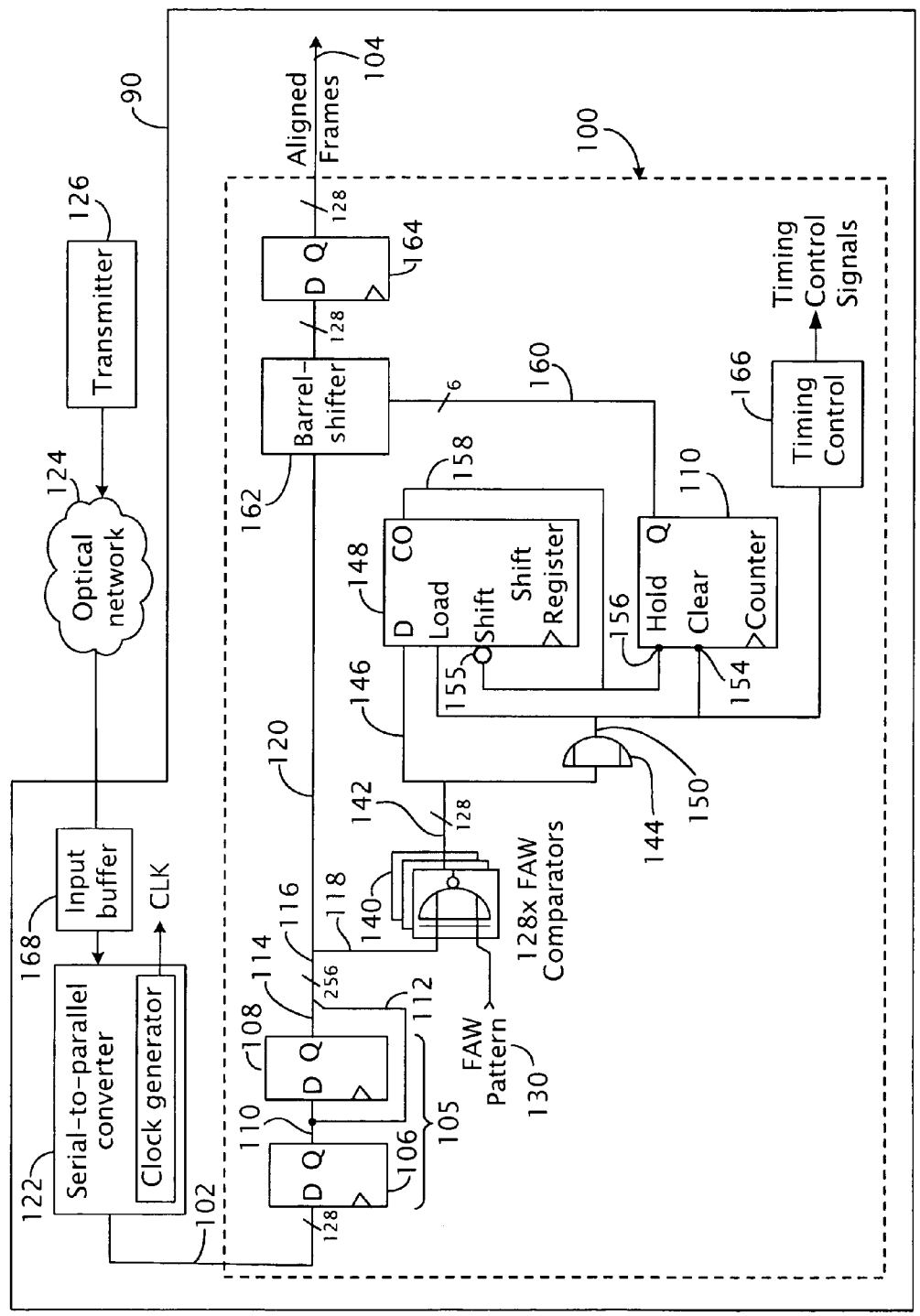
FIG. 1 is a block diagram of an alignment module used in an optical network.

Referring to FIG. 1, a transmitter 126 generates a serial bit stream from data frames, each frame having 1020 data words, each word having 128 bits (16 bytes). The first 6 bytes of each frame is a frame alignment word (FAW) used to facilitate reconstruction of correctly aligned data frames by a receiver 90. An example of an FAW is "F6F6F6282828" in hexadecimal representation. The parallel 128-bit data words are clocked at 83 MHz, and the serial bit stream has a data rate of 10.7 giga-bits-per-second (Gbps). The serial bit stream is transmitted through an optical network 124 to an input buffer 168 and a serial-to-parallel converter 122 in receiver 90. Converter 122 converts the 10.7 Gbps serial bit stream into a stream of un-aligned 128-bit parallel data words clocked at 83 MHz on a data bus 102.

Receiver 90 includes an alignment module 100 that processes the stream of un-aligned data words to find an FAW, aligns the data words based on the FAW, and generates correctly aligned 128-bit data words clocked at 83 MHz on a data bus 104. By using components with low logic depth, alignment module 100 may be clocked at a higher frequency so that it may handle signals with a higher frequency.

Logic depth refers to the number of logic gates in the signal path between the input and output of a component. A component with a lower logic depth requires a shorter clock cycle to obtain an accurate output signal because the delay between the output and the input signals is smaller.

Alignment module 100 includes a "double-word" generator 105 which receives the stream of un-aligned 128-bit data words on bus 102 and generates a stream of 256-bit "double-words" by concatenating consecutive data words.

As an example, assume that the first un-aligned data word contains the $1^{st}$ to $128^{th}$ bits in the serial bit stream, and is written as $W_1[1, 2, \ldots, 128]$. The second data word is $W_2[129, \ldots, 256]$, the third data word is $W_3[266, \ldots, 384]$, the fourth data word is $W_4[385, \ldots, 512]$, and so forth. The first double-word generated on bus 116 then contains the $1^{st}$ to $256^{th}$ bits in the serial bit stream, and is written as $DW_1[1, 2, \ldots, 256]$. The second double-word contains the $129^{th}$ to $384^{th}$ bits in the serial bit stream, and is written as $DW_2[129, \ldots, 384]$. The third double-word is written as $DW_3[257, \ldots, 512]$, and so forth.

Double-word generator 105 includes buffer register 106 and buffer register 108 connected in series such that the output of buffer register 108 lags one clock cycle behind the output of buffer register 106. Clock signal lines have been omitted in the figure. The outputs of buffer registers 106 and 108 are generated on 128-bit data buses 112 and 114, respectively, which are combined into a 256-bit data bus 116. The parallel data on bus 116 is referred to as "double-words" because they have twice the bit-width as the original data words.

The double-words are sent to FAW comparators 140 through a data bus 118. Each comparator may compare two 48-bit patterns, one pattern comprising a 48-bit segment of a double-word on data bus, the other pattern comprising a 6-byte (48-bit) FAW 130. A total of 128 FAW comparators are used to compare different segments of each double word to the FAW. The FAW is predefined and known to both the transmitter and the receiver. The first comparator 140 compares the $1^{st}$ to $48^{th}$ bits of the double-word to the FAW. If a match occurs, a logic high signal is generated on the first signal line of a 128-bit data bus 142. The second comparator 140 compares the $2^{nd}$ to $49^{th}$ bits of the double-word to FAW 130. If a match occurs, then a logic high signal is generated on the second signal line of data bus 142, and so forth. The comparators 140 perform the comparisons in parallel so that when a logic high signal appears in one of the signal lines of data bus 142, all of the comparators will have finished the comparisons.

The signals on data bus 142 are sent to an OR device 144 that generates a logic high signal on a signal line 150 when one of the signal lines of data bus 142 has a logic high. Signal line 150 is connected to a LOAD control input 152 of a 128-bit shift register 148. When the LOAD control input receives a logic high signal, shift register 148 loads the signals on a data bus 146 that is connected to data bus 142. In this way, when comparators 140 finish the comparisons, the comparison results are loaded into shift register 148. The output of OR device 144 is also connected to a CLEAR control input 154 of a counter 110. When CLEAR control input 154 receives a logic high signal, the count of counter 110 is reset to zero. The count represents the position of the FAW in a particular double-word on bus 118. The count also represents the number of bits that the un-aligned words are offset from the original words (i.e., words before being converted into the serial bit stream).

Shift register 148 shifts the loaded signals (from data bus 146) once every clock cycle until a logic high signal appears at the carry out (CO) output 158. The CO output 158 is connected to a SHIFT ENABLE control input 155 of shift register 148. Shift register 148 shifts the input signals during each clock cycle when SHIFT ENABLE control input 155 receives a logic low signal. The shift operation is stopped when input 155 receives a logic high signal. Each time shift register 148 shifts the input signals; counter 110 increases the count by one. The count is generated on a 6-bit data bus 160. The CO output 158 is also connected to a HOLD control input 156 of counter 110 so that the count is maintained when a logic high signal appears at the CO output 158.

Data bus 160 is connected to control inputs of a barrel shifter 162, which also receives the stream of double-words from data bus 120. Barrel shifter 162 barrel-shifts the double-words based on the count number represented by the signals on data bus 160. Thus, the first 128-bits of each barrel-shifted double-word is an aligned data word. Barrel shifter 162 sends the aligned 128-bit data words to an output buffer 164, which sends the aligned data words to data bus 104.

The output of OR device 144 is also connected to a timing control block 166 that generates timing control signals for other parts of the receiver 90. In this way, the timing control signals are synchronized to the data words on data bus 104.

The synchronization process described above may be used to align data words after power up or a system reset, or after predetermined exception conditions occur. Once the receiver 90 enters a synchronized state, i.e., the data words are aligned, the barrel shifter 162 latches the signals on data bus 160 and thereafter barrel-shifts the double-words based on the counts represented by the latched signals.

By using the combination of the shift register and the counter to detect which comparator 140 detected the FAW, the alignment module 100 may be constructed with a low logic depth. This allows the module to operate at a higher clock rate to handle input signals having a higher frequency (e.g., signals transmitted through optical transport networks).

Figure 2:
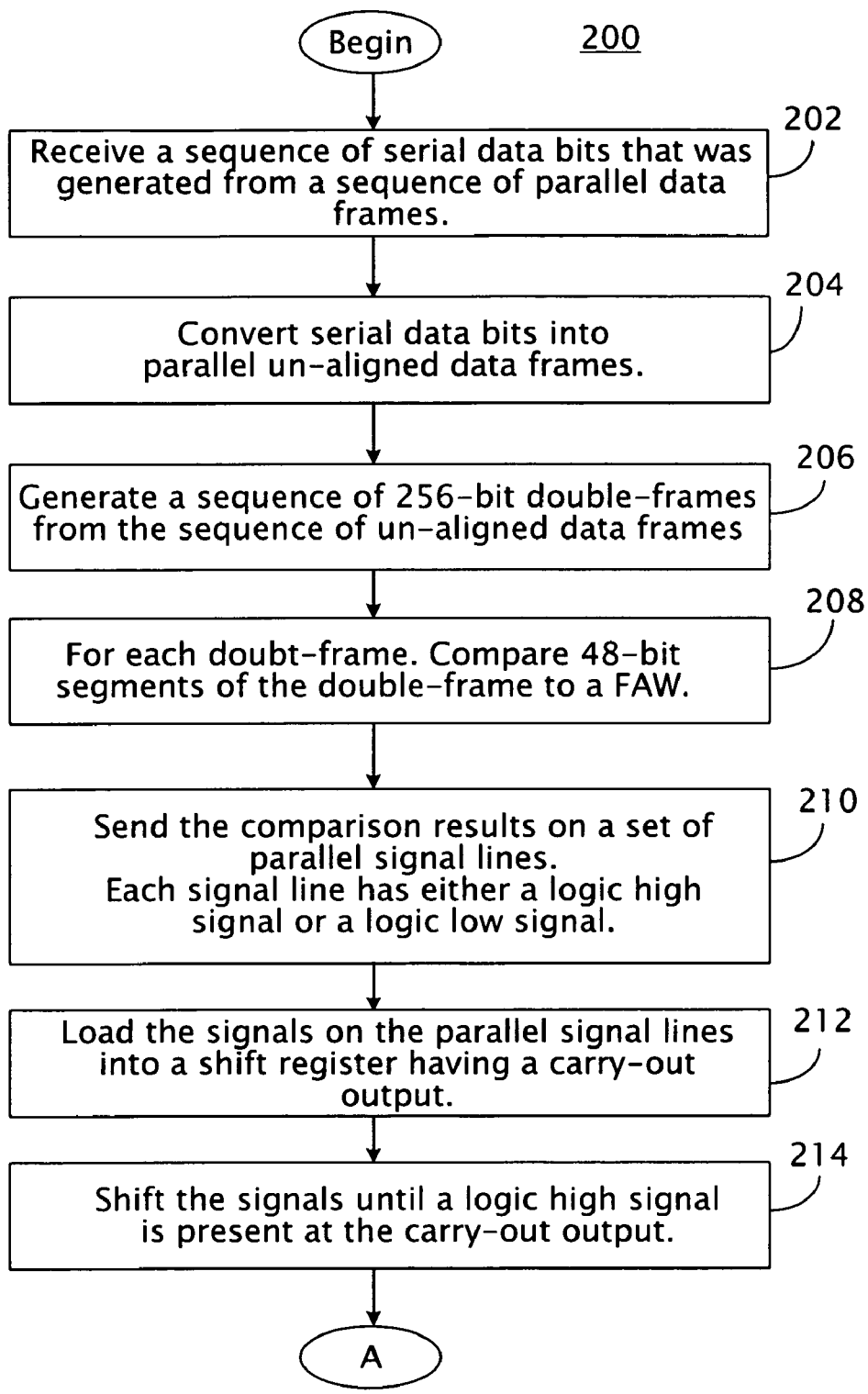
FIGS. 2 and 3 show a flowchart of a method for constructing aligned parallel data words from a sequence of serial data bits.
Figure 3:
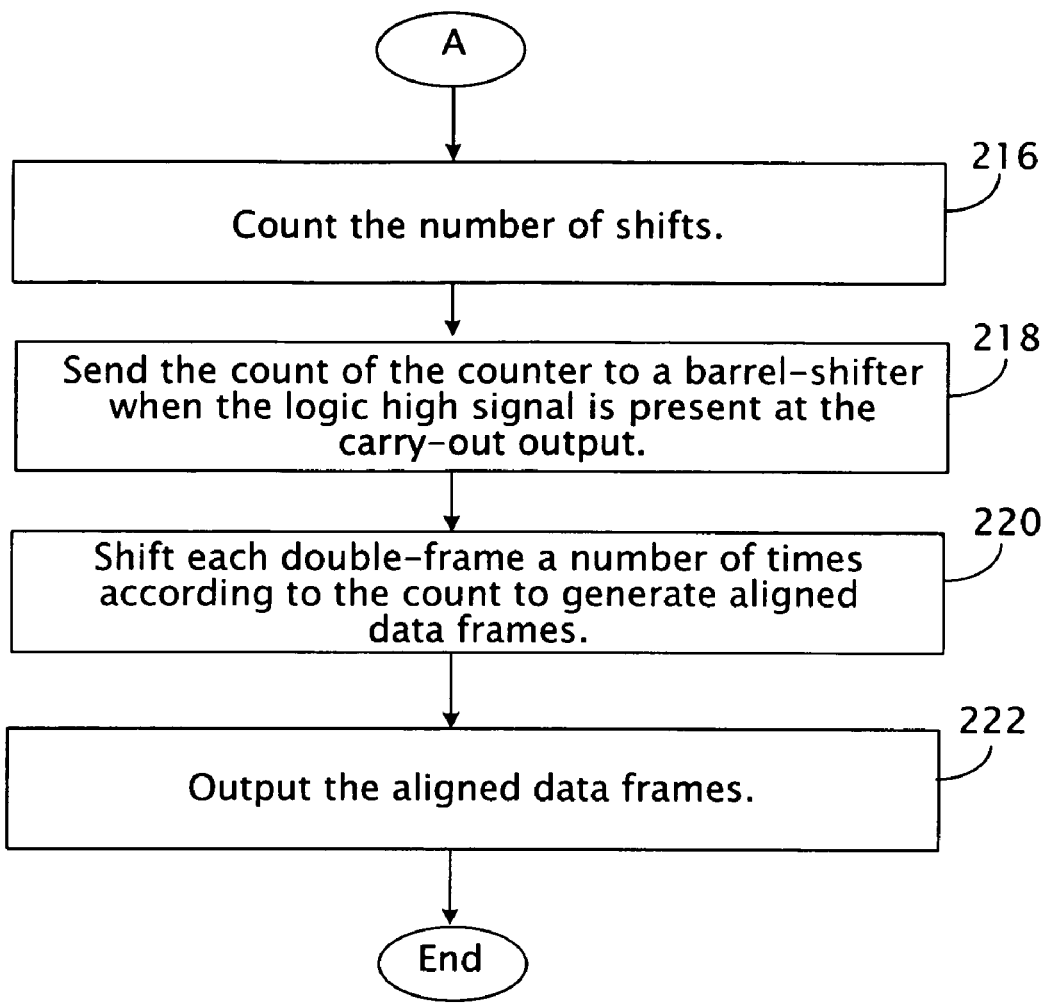

Referring to FIGS. 2 and 3, a process 200 illustrates an example of a receiver 90 converting a sequence of serial data bits into a sequence of parallel data words that are properly aligned. Receiver 90 receives 202 a sequence of serial data bits from an optical network 124. Transmitter 126 generates the sequence of serial data bits from a sequence of parallel 128-bit data words. A serial-to-parallel converter 122 converts 204 the sequence of serial data bits into a sequence of 128-bit un-aligned data words. A double-word generator 105 generates 206 a sequence of 256-bit double-words from the sequence of un-aligned data words. Consecutive un-aligned data words are concatenated into the double-words. The first half of each double-word is a duplicate of the second half of a preceding double-word.

For each double-word, comparators 140 compares 208 48-bit segments of the double-word to a 6-byte FAW that is agreed upon by transmitter 126 and receiver 90. There are 128 comparisons performed in parallel. Comparators 140 send 210 the comparison results on a set of parallel signal lines 142. Each signal line has either a logic high signal representing a match between a segment of the double-word and the FAW or a second logic signal where there is no match.

A shift register 148 having a carry-out output 158 loads 212 the signals on parallel signal lines 146 connected to lines 142. Shift register 148 shifts 214 the signals until a logic high signal is present at the carry-out output 158. A counter 110 counts 216 the number of shifts, and sends 218 the count to a barrel-shifter 162 when the logic high signal is present at the carry-out output 158. Barrel-shifter 162 receives the sequence of double-words as input, and shifts 220 each double-word a number of times according to the count to generate aligned data words. An output buffer 164 connected to barrel shifter 162 outputs 222 the aligned data words on bus 104.

Although some implementations have been described, other embodiments are also within the scope of the following claims.

For example, other types of networks may replace optical network 124. Different FAW patterns, and FAW of different sizes may be used for the alignment of the data words. The data words do not necessarily have to be grouped into frames, and the FAW may be inserted every predetermined number of data words. If frames are used, the number of bytes in a frame may be different than the one described. The data rate of the serial bit stream and data words may be different from the ones described. Each data word may have a different number of bits than the one described, and each component used in the alignment module 100 may be capable of handling a different number of bits depending on the bit width of the data words. Logic high signals and logic low signals may be used interchangeably. The barrel shifter 162 may be other types of devices that perform shift operations on the signals on data bus 120 based on the count number sent from counter 110.

What is claimed is:

1. An apparatus comprising:
   an input buffer to receive a serial sequence of data bits from an optical network;
   a serial-to-parallel converter to convert the serial sequence of data bits into a sequence of un-aligned data words;
   a double-word generator to receive the sequence of un-aligned data words and generate a sequence of double-words, each double-word including two consecutive un-aligned data words;
   comparators to compare segments of the double-words to a predefined bit pattern, each comparator to generate a comparison signal having a first logic state when there is a match between a segment and the predefined bit pattern and a second logic state when there is no match; and
   a shift register having inputs and a carry-out output, each input to receive one of the comparison signals, the shift register to perform shift operations to shift the comparison signals at the inputs until the first logic state is present at the carry-out output.

2. The apparatus of claim 1, further comprising a counter to count the number of shift operations performed by the shift register.

3. The apparatus of claim 1, wherein the serial sequence of data bits is generated from a sequence of parallel data words.

4. The apparatus of claim 1, further comprising a barrel shifter to perform barrel-shift operations on the double-words based on the number of shift operations performed by the shift register to generate aligned data words.

5. The apparatus of claim 1, further comprising a clock signal generator to generate a clock signal for synchronizing the input buffer, comparators, and the shift register.

6. The apparatus of claim 5, wherein the clock signal has a frequency greater than 50 MHz.

7. An apparatus comprising:
   a data bus to receive a sequence of un-aligned data words;
   a double-word generator coupled to the data bus to concatenate two consecutive un-aligned data words to generate a sequence of double-words;
   comparators to compare segments of the double-words to a predefined bit pattern, each comparator to generate a comparison signal having a first logic state when there is a match between a segment and the predefined bit pattern and a second logic state when there is no match;

a shift register having inputs and a carry-out output, each input to receive one of the comparison signals, the shift register to perform shift operations to shift the comparison signals at the inputs until the first logic state is present at the carry-out output; and a barrel shifter to perform barrel-shift operations on the double-words based on the number of shift operations performed by the shift register to generate aligned data words.

8. The apparatus of claim 7, wherein the sequence of un-aligned data words has a data rate greater than 1 gigabit-per-second.

9. The apparatus of claim 7, wherein each data word has a number of bits, the number being an integer multiple of 32.

10. The apparatus of claim 9, wherein the sequence of data words has a frequency of about 83 MHz.

11. The apparatus of claim 7, further comprising a counter to count the number of shift operations performed by the shift register.

12. A method comprising:

receiving a sequence of data bits;

converting the sequence of data bits into un-aligned data words;

generating double-words, each double-word including two consecutive un-aligned data words, the first half of each double-word being a duplicate of the second half of a preceding double-word;

comparing segments of the double-words to a predefined bit pattern, the comparisons performed in parallel;

generating the comparison results on a set of parallel signal lines, each signal line having either a first logic signal representing a match between a segment and the predefined bit pattern or a second logic signal representing there is not a match between the segment and the predefined bit pattern; and shifting the signals on the parallel signal lines using a shift register having a carry-out output until the first logic signal is present at the carry-out output.

13. The method of claim 12, further comprising shifting the double-words and using a portion of each shifted double-word to generate aligned data words, the number of shifts performed on the double-words based on the number of shifts performed in shifting the signals.

14. The method of claim 13, further comprising counting the number of shifts performed in shifting the signals on the parallel signal lines to generate a count, the count used in shifting the double-words.

\* \* \* \* \*